United States Patent Office 3,794,620
Patented Feb. 26, 1974

3,794,620
PREPARATION OF AROMATIC CARBONYL HYDROXAMOYL CHLORIDES
John H. Bateman, Haverstraw, N.Y., assignor to Ciba-Geigy Corporation, Ardsley, N.Y.
No Drawing. Filed Apr. 30, 1971, Ser. No. 139,136
Int. Cl. C07c 131/00
U.S. Cl. 260—566 A  6 Claims

ABSTRACT OF THE DISCLOSURE

Aromatic carbonyl hydroxamoyl chlorides are prepared by a process comprising reacting an aromatic acetyl compound with nitrosyl chloride in an inert solvent, at a temperature of from −5 to 25° C. It is of critical importance that the nitrosyl chloride be free of contaminants which interfere with said reaction. These compounds are useful as crosslinking, chain extending and/or capping agents for unsaturated polymers or polymers containing mercaptan groups.

BACKGROUND OF THE INVENTION

Present feasible routes available to aromatic carbonyl hydroxamoyl chloride involves such methods as the chlorination and nitrosation of acetyl derivatives or preparation of carbonyl nitrolic acid followed by treatment with hydrogen chloride as described in U.S. Pat. No. 3,504,017. The early German literature [L. Claisen and O. Manasse, Ann., 274, 95 (1893); and H. Rheinboldt and O. S. Dumont, Ann., 444, 113 (1925)] reports the failure of several aromatic monofunctional acetal derivatives to undergo reaction with nitrosyl chloride in the condensed phase. The experiments described in this literature did establish, however, the successful conversion in solution, of several aliphatic methylketones, and several aromatic monofunctional acetyl derivatives in the gaseous phase to the corresponding carbonyl hydroxamoyl chloride with nitrosyl chloride. Thus, the aromatic acetyl derivatives must be volatile to be able to prepare the corresponding hydroxamoyl chlorides by the prior art method. Hydroxamoyl chlorides could not be prepared by the prior art method from the non-volatile aromatic acetyl derivatives. Large scale vapor phase production of aromatic carbonyl hydroxamoyl chloride is totally impractical by the prior art method using nitrosyl chloride.

DETAILED DESCRIPTION

In accordance with the present invention, the reaction of aromatic acetyl derivatives with nitrosyl chloride is carried out in the condensed phase in solution to produce the corresponding aromatic carbonyl hydroxamoyl chloride in good yields. More specifically, this invention is directed to a process for the preparation of polyfunctional aromatic carbonyl hydroxamoyl chlorides having the formula

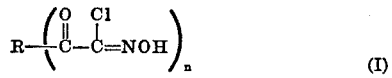

(I)

wherein R is an aromatic hydrocarbon radical, aromatic-oxyaromatic hydrocarbon radical, aromatic-alkylenearomatic hydrocarbon radical, or the like; and n is an integer from 1 to 5; said process comprising reacting an aromatic acetyl compound of the formula

(II)

wherein R and n are as defined above, with nitrosyl chloride in an inert solvent at a temperature of from about −20 to about 50° C., wherein said acetyl derivative is present in an amount of from 1 to 75 percent by weight of the total reaction mixture and said nitrosyl chloride is free of impurities which interfere with the production of said aromatic carbonyl hydroxamoyl chloride. Preferably, nitrosyl chloride should be at least 99 percent pure.

Suitable aromatic acetyl derivatives which can be used in the process of this invention include those wherein the R group of Formula I is any aromatic radical inert to nitrosyl chloride as for example, where R is arylenyl such as phenenyl, or arylene, alkarylene, arylenealkylenearylene, or diarylene, etc. Specific examples of these radicals are phenylene, naphthalene, biphenylene, anthrylene, xylylene, phenylenemethylenephenylene, phenyleneethylenephenylene, or an aryleneoxyarylene, alkarylene-oxy-alkarylene such as phenylene-oxy-phenylene; phenylene-oxy-methylenephenylene. The maximum value for n will depend on the number of carbon atoms in R, since the value of n cannot exceed the valence of R. Preferably, n will be an integer of from 2 to 3.

Exempliary of these aromatic acetyl derivatives are 1,4-diacetylbenzene, 1,3,5-triacetylbenzene, bis(4-acetylphenyl)ether, 4,4′-diacetylbiphenyl, bis(4-acetylphenyl)methane. Aromatic acetyl compounds can be prepared by normal Friedel-Craft reaction as described by D. P. N. Satchell, Quart.; Rev. (London), 17, 160 (1963) and P. H. Gore, Chem. Rev., 55, 229 (1959) or by condensation reactions as described in Organic Synthesis, vol. III, p. 829 (1955).

The reaction is carried out at a temperature of from −20° to about 50° C. For best yields, a temperature range of from −5 to 25° C. is preferred. As mentioned above, any solvent inert to nitrosyl chloride in which nitrosyl chloride possesses an appreciable solubility is suitable. It is not necessary that the reactant be completely soluble in the "solvent" for the reaction to take place. It may sometimes be desirable to choose a solvent in which the starting material is only slightly soluble and the product is completely soluble. Using such a solvent, the reaction can be monitored by watching the disappearance of the starting material.

Examples of suitable solvents are the saturated aliphatic hydrocarbons such as hexane, heptane, cyclohexane and the like; chlorinated aliphatic hydrocarbons such as carbon tetrachloride, methylene chloride, chloroform and the like; aromatic and substituted aromatic hydrocarbons such as benzene, toluene, xylene and the like; aliphatic esters such as methyl acetate, ethyl acetate, methyl propionate or the like; and aliphatic ethers such as diethyl ether, dimethoxydiethyl ether and the like. Examples of solvents to be avoided are pyridine, acetone, and unsaturated solvents.

Stoichiometrically, the process of this invention can be represented by the following chemical reaction

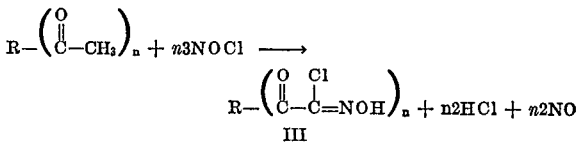

III wherein R and n are as previously defined.

Thus, it may be seen that for every acetyl group, three moles of nitrosyl chloride are needed. It is generally preferable to have a slight excess of nitrosyl chloride to insure that the product is completely converted to the hydroxamoyl chloride. Concentration of the acetyl compound in the reaction mixture can range from 1 to 75% by weight of the total reaction mixture and preferably in the range of 5 to 25%.

In the most preferred embodiment of the process of this invention, a suspension containing 10 weight percent of the aromatic acetyl compound in anhydrous ethyl ether is cooled in an ice bath. Nitrosyl chloride is slowly bubbled into the stirred suspension for about one and one-half hour. The mixture is then allowed to stand at room temperature for from 3 to 20 hours. The reaction mixture is filtered and stripped of solvent to afford the product which can be used directly or recrystallized from a suitable solvent.

The aromatic carbonyl hydroxamoyl chlorides when used in conjunction with an acid acceptor or alkaline material such as tertiary amines and alkali, alkaline earth metal hydroxides, are useful as capping, cross-linking and chain extending agents for polymers containing unsaturation or thiol groups. These compounds are useful as precursors to polyfunctional carbonyl nitrile oxides which are very reactive chemical intermediates.

To illustrate more specifically the process of this invention, the following examples are presented below.

EXAMPLE 1

1,3,5-phenyltris(glyoxylohydroxamoyl chloride)

A suspension of 6.0 g. (29.4 mmoles) 1,3,5-triacetylbenzene in 200 ml. anhydrous diethyl ether was cooled in an ice bath. Nitrosyl chloride (99.2 mole percent, Matheson Company, Inc.) was bubbled into the suspension for three hours. The mixture was allowed to stand at room temperature for 16 hours. The solution had changed from deep red to colorless and was subsequently filtered. The ether was stripped affording an oil. The oil was triturated with hot carbon tetrachloride yielding the product which was an off-white solid decomposing at 290–295° C.

The product showed carbonyl absorption at 1670 cm.$^{-1}$ (KBr) in agreement with that expected for 1,3,5-phenyltris(glyoxylohydroxamoyl chloride). Elemental analysis was also in agreement.

*Analysis.*—Calculated for $C_{12}H_6O_6N_3Cl_3$ (percent): C, 36.53; H, 1.53; N, 10.65; Cl, 26.96. Found (percent): C, 36.27; H, 1.96; N, 10.37; Cl, 26.61.

A product of substantially the same yield and purity is obtained when one of the solvents, i.e., carbon tetrachloride, benzene, ethyl acetate or chloroform is substituted for diethyl ether in the above experiment.

EXAMPLE 2

1,4-phenylbis(glyoxylohydroxamoyl chloride)

Under anhydrous conditions, 10.0 g. (61.5 mmoles) p-diacetylbenzene was suspended in 150 ml. anhydrous diethyl ether at 0° C. Nitrosyl chloride (99.2 mole percent, Matheson Co., Inc.) was bubbled into the solution for one hour. The solution was allowed to come to room temperature and allowed to react for another 16 hours. The mixture was again cooled to 0° C. and saturated with nitrosyl chloride for 1 hour. After stirring for 16 hours at room temperature, the reaction mixture was filtered and an off-white cystalline material collected, decomposing 230–235° C.

Spectral data were in agreement with 1,4-phenylbis-glyoxylohydroxamoyl chloride). The infrared spectrum of the product showed a strong carbonyl bond at 1658 cm.$^{-1}$ and an imino (C=N) bond at 1578 cm.$^{-1}$. The nuclear magnetic resonance (NMR) spectrum showed only aromatic and OH absorption and no methyl groups. Elemental analysis was also in agreement.

*Analysis.*—Calculated for $C_{10}H_6N_2O_4Cl_2$ (percent): C, 41.55; H, 2.09; N, 9.69; Cl, 24.53. Found (percent): C, 41.70; H, 2.16; N, 9.71; Cl, 24.36.

A product of substantially the same yield and purity is obtained when a temperature of −5° C., 10° C. and 25° C. is used instead of 0° C. in the above experiment.

EXAMPLE 3

4,4′-oxybis(phenylglyoxylohydroxamoyl chloride)

A suspension of 100.0 g. (391 mmoles) bis(4-acetylphenyl)ether in 3800 ml. anhydrous diethyl ether was cooled to 5° C. Nitrosyl chloride (99.2 moles percent, Matheson Co., Inc. ) was bubbled into the mixture for 5 hours after which the mixture was allowed to come to room temperature. The reaction was continued for 96 hours. The reaction mixture was filtered, the ether stripped and off-white crystals isolated which were triturated twice with chloroform yielding an analytically pure white solid decomposing 175.5–177.5° C. All spectral data agreed with 4,4′-oxybis(phenylglyoxylohydroxamoyl chloride) as the structure of the product.

EXAMPLE 4

4,4′-methylenebis(phenylglyoxylohydroxamoyl chloride)

A suspension of 6.31 g. (25 mmoles) bis(4-acetylphenyl)methane in 150 ml. anhydrous diethyl ether was cooled in an ice bath. Nitrosyl chloride (99.2 mole percent, Matheson Co., Inc.) was slowly bubbled into the stirred suspension for 1.5 hours. The mixture was warmed to room temperature and the reaction was continued for 72 hours. The resulting solution was filtered and the filtrate stripped of solvent to afford an oil that slowly crystallized upon standing. The product was recrystallized from chlorobenzene and had a melting point of 155–157° C. All spectral and analytical data agreed with 4,4′-methylenebis(phenylglyoxylohydroxamoyl chloride) as the structure of the product.

What is claimed is:

1. A process for the preparation of aromatic carbonyl hydroxyamoyl chlorides having the formula

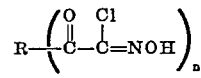

wherein

R is an aromatic hydrocarbon radical, aromatic-oxyaromatic hydrocarbon radical, or aromatic-alkylenearomatic hydrocarbon radical;

n is an integer from 1 to 5; said process comprising reacting an aromatic acetyl compound of the formula

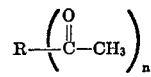

wherein R and n are defined above, with nitrosyl chloride; in an inert solvent at a temperature of from about −20 to about 50° C.; wherein said acetyl derivative is present in an amount ranging from 1 to 75% by weight of the total reaction mixture, and said nitrosyl chloride is at least 99% pure.

2. The process of claim 1 wherein said process is carried out in diethyl ether at a temperature of from about −5° C. to about 25° C. and the concentration of said aromatic acetyl compound is between 5% and 25% by weight.

3. The process of claim 2 wherein said R group of the aromatic acetyl compound is phenylene.

4. The process of claim 2 wherein said R group of the aromatic acetyl compound is phenylene-oxyphenylene.

5. The process of claim 2 wherein said R group of the aromatic acetyl compound is phenylenemethylenephenylene.

6. The process of claim 2 wherein said R group of the aromatic acetyl compound is phenenyl.

References Cited

UNITED STATES PATENTS 3,504,017   3/1970   Breslow _____ 260—482

LEON ZITVER, Primary Examiner

GERALD A. SCHWARTZ, Assistant Examiner